United States Patent [19]

McGinniss

[11] Patent Number: 4,529,563

[45] Date of Patent: Jul. 16, 1985

[54] VAPOROUS SOLVENT TREATMENT OF THERMOPLASTIC SUBSTRATES

[75] Inventor: Vincent D. McGinniss, Delaware, Ohio

[73] Assignee: Robert G. Fais, Columbus, Ohio

[21] Appl. No.: 553,647

[22] Filed: Nov. 21, 1983

[51] Int. Cl.$^3$ ............................................. B29C 25/00
[52] U.S. Cl. ..................................... 264/83; 264/341; 264/343
[58] Field of Search ................... 264/83, 341, 343, 82, 264/48

[56] References Cited

U.S. PATENT DOCUMENTS

| | | | |
|---|---|---|---|
| 2,126,714 | 8/1938 | Anderson et al. | 264/341 |
| 2,294,479 | 9/1942 | Peter | 117/63 |
| 3,020,661 | 2/1962 | Miller et al. | 41/41 |
| 3,473,960 | 10/1969 | Jacobson et al. | 117/237 |
| 3,524,795 | 8/1970 | Peterson | 264/171 |
| 3,546,331 | 12/1970 | Niegisch | 264/343 |
| 3,684,553 | 8/1972 | VanDyk | 117/63 |
| 3,807,054 | 4/1974 | Joseph et al. | 264/341 |
| 4,302,418 | 11/1981 | Cullis et al. | 264/341 |

FOREIGN PATENT DOCUMENTS 1944931 1/1971 Fed. Rep. of Germany ...... 264/341

OTHER PUBLICATIONS

Solubility Parameters for Film Formers, H. Burrell, Official Dig. Fed. Soc. Paint Tech., 27, 1955, pp. 726-759.
The Chemistry of Organic Film Formers, D. H. Solomon, Robert E. Krieger Pub. Co., 1977, pp. 32-33.
Organic Coatings and Plastics Chemistry, vol. 39, Amer. Chem. Soc., 1978, pp. 529-534.
Organic Coatings and Applied Polymer Science Proceedings, vol. 46, Amer. Chem. Soc., 1981, pp. 214-223.

*Primary Examiner*—Donald Czaja
*Assistant Examiner*—V. Fischbach
*Attorney, Agent, or Firm*—Mueller and Smith

[57] ABSTRACT

Disclosed is a method for treating a thermoplastic substrate for improving the surface thereof without significant loss of physical properties. Such method comprises:

(a) determining the solubility parameter, $\delta_T$, of said thermoplastic substrate and the surface energy, $\gamma_T$, of said thermoplastic substrate;

(b) determining a set of destructive solvents which are detrimental to a physical property of said thermoplastic substrate;

(c) determining a set of non-destructive solvents which are not detrimental to the physical properties of said thermoplastic substrate;

(d) determining the solubility parameters for said set of destructive solvent, $\delta_D$, and for said set of non-destructive solvent, $\delta_N$, and the surface tension for said set of destructive solvent, $\gamma_D$, and for said non-destructive solvent, $\gamma_N$;

(e) selecting a subset of said destructive solvents which possess solubility parameters, $\delta_D$, close to the solubility parameter of said thermoplastic substrate, $\delta_T$;

(f) selecting sub-combinations of said subset of destructive solvents (e), and said subset (c) of non-destructive solvents which form azeotropic mixtures, at least one of said solvents possessing a surface tension which is less than the surface energy of said thermoplastic substrate; and (g) treating said surface with at least one of said select subcombinations in the vapor phase.

8 Claims, No Drawings

VAPOROUS SOLVENT TREATMENT OF THERMOPLASTIC SUBSTRATES

BACKGROUND OF THE INVENTION

The present invention relates to the surface treatment of thermoplastic substrates and more particularly to an improved solvent system therefor.

The interaction of solvent systems (liquid or vapor at room temperature or at elevated temperature) with plastic materials for their cleaning, polishing, or other apparent superficial property enhancement is well documented in the art. U.S. Pat. No. 2,294,479 combines the good solvency power of ketones, esters, ethers, aromatics, or alcohols for cellulose and vinyl coatings with the non-solvent (non-explosive) characteristics of chlorinated solvents for elevated temperature, atmospheric vapor-phase polishing or surface smoothing of a cured lacquer coating system. For example, cellulose lacquer paint films were surface polished with an azeotropic mixture of 29 weight parts methyl ethyl ketone and 71 weight parts carbon tetrachloride at an elevated temperature of 73.8° C. U.S. Pat. No. 3,020,661 proposes to polish the surface of cellulosic polymers as well as remove extraneous mold flash by utilizing a combination of ketone solvents and chlorinated non-solvents at elevated temperature and at atmospheric pressure. This proposal notes the importance in maintaining the temperature of the solvent mixture above its boiling point but below the melting point of the cellulosic polymer and for maintaining a contact time sufficient for leveling out the surface of the polymer while simultaneously removing the mold flash from the plastic part.

U.S. Pat. No. 3,807,054 also is directed to an atmospheric pressure vapor phase plastic surface polishing process wherein polyethyelene parts are treated with a mixture of chlorinated hydrocarbon solvents and cellulose acetate. U.S. Pat. No. 4,302,418 utilizes high temperature conditioning of polymethylpentene plastic materials so that a chlorinated solvent will interact with the plastic material and cause flow-out and improved surface appearance qualities. The chlorinated solvent of choice is defined to be a non-solvent for the plastic substrate at lower temperatures. U.S. Pat. No. 3,684,553 utilizes a vacuum process for controlling vapor pressure of a solvent-plastic smoothing composition while U.S. Pat. No. 3,473,960 proposes to totally immerse the plastic part in a solvent in order to achieve polymer-flow or surface smoothing.

The foregoing art does not recognize certain fundamental critical relationships regulating the interaction of solvents (liquid or vapor at low and elevated temperature) and polymeric materials. The classification of a solvent as being a "solvent" or a "non-solvent" for a particular plastic material is inadequate for properly determining whether a particular solvent or solvent mixture will display a deleterious effect on the plastic material regardless of the phase of the solvent (gas or liquid) or the contact temperature conditions. It is important to recognize that each plastic material is different in chemical structure and will not respond favorably to just any generalized class of solvent systems which the art teaches to be useful in surface smoothing processes. For example, polyethylene has been shown to be capable of being surface-finished with chlorinated solvents, but it is documented that polyethylene parts also undergo brittle fracture when contacted with chlorinated solvents, alcohols, esters, phenols, aromatic hydrocarbons, and aliphatic hydrocarbons. Polyethylene is known to fail rapidly under load conditions in the presence of non-solvents such as, for example, hexane or xylene at room temperature (H. R. Brown, "Polymer", Vol. 19, 1186, 1978). Polycarbonate rapidly loses its original tensile strength when exposed to amines, ketones, aldehydes, chlorinated hydrocarbons, low molecular weight esters and ethers, and aromatic hydrocarbons. Nylons are known to be resistant to most solvents, but degrade rapidly in the presence of phenols and aqueous solutions of inorganic acids. Polysulfones degrade in the presence of amines, ketones, aldehydes, chlorinated solvents, ethers, aromatic hydrocarbons, phenols, amides, and nitriles. Polyphenylene oxides degrade in the presence of amines, ketones, aldehydes, chlorinated hydrocarbons, esters, ethers, certain aliphatic and aromatic hydrocarbons, nitriles, and phenols (D. G. Brady and H. W. Hill, "Modern Plastics", 60, May, 1974). Both polycarbonate and polyacrylate (polymethacrylate) plastics are extremely sensitive to different classes of solvent interactions under load conditions (V. D. McGinniss, "Organic Coatings and Plastic Chemistry", Vol. 39,529,1978).

The prior art uniformly discloses solvent-polymer interactions which frequently lead to immediate or long-term degradation of the ultimate structural polymeric properties. The present invention is a significant step forward in the art in its ability to select practical solvent systems for surface finishing of a wide variety of plastic materials without damaging the original polymer structure or making it unsuitable in its original use for which it was intended. Immediate as well as long-term degradation effects of brief solvent-exposure processing operations are minimized or eliminated in accordance with the present invention.

BROAD STATEMENT OF THE INVENTION

The present invention is a method for treating the surface of a thermoplastic substrate for improving the surface thereof without significant loss of physical properties. Such method comprises: (a) determining the solubility parameter, $\delta_T$, of said thermoplastic substrate and the surface energy, $\gamma_T$, of said thermoplastic substrate; (b) determining a set of non-destructive solvents which are not detrimental to the physical properties of said thermoplastic substrate; (c) determine the solubility parameters for said non-destructive solvents, $\delta_N$, and the surface tension for said non-destructive solvents, $\gamma_N$; (d) selecting a subset of said non-destructive solvents which possess a solubility parameter close to the solubility parameter of said thermoplastic substrate and which possess a surface tension which is less than the surface energy of said thermoplastic substrate; and (e) treating said surface with at least one of said subset of said non-destructive solvents.

An alternative embodiment of the present invention comprises: (a) determining the solubility parameter of the thermoplastic substrate and the surface energy of the thermoplastic substrate; (b) determining a set of destructive solvents which are detrimental to a physical property of the thermoplastic substrate; (c) determining a set of non-destructive solvents which are not detrimental to the physical properties of the thermoplastic substrate; (d) determining the solubility parameters for the destructive solvent and for the non-destructive solvent, and the surface tension for the destructive solvent and for the non-destructive solvent; (e) selecting a subset of the destructive solvents which possess solubility parameters close to the solubility parameter of the thermoplastic substrate and which possess a surface tension which is less than the surface energy of the thermoplastic substrate; (f) selecting a subset of said non-destructive solvents which possess a surface tension which is less than the surface energy of the thermoplastic substrate; (g) selecting sub-combinations of said subset of destructive solvents (e) and said subset of non-destructive solvents (f) which form azeotropic mixtures; and (h) treating the surface of said thermoplastic substrate with at least one of said select sub-combination azeotropic mixtures.

In said alternative embodiment, the solubility parameter of the non-destructive solvent is selected to be close to the solubility parameter of the thermoplastic substrate. Further refinements of the alternative embodiment include the selection of azeotropic mixtures which minimize the volume of destructive solvent present. Further, in order to further minimize the possibility of undesirable interaction between the destructive solvent and the thermoplastic substrate, the destructive solvent of choice is selected to have a large molecular size or molecular volume.

Advantages of the present invention include the ability to surface treat or clean a thermoplastic part without attendant loss of physical properties of the thermoplastic part. A further advantage is the ability to select several solvent systems which will effectively accomplish the surface treatment leaving the particular system to utilize to be determined by other factors such as, for example, cost, availability, toxicity, solvent emission standards, and like factors. These and other advantages will be readily apparent to those skilled in the art based upon the disclosure contained herein.

DETAILED DESCRIPTION OF THE INVENTION

For realization of the maximum advantages which the present invention provides in the surface treatment of thermoplastic substrates without attendant loss of physical properties, careful characterization of key parameters of the thermoplastic substrate and of the solvents to be utilized must be undertaken and understood. Referring initially to the thermoplastic material or polymeric structure to be subjected to the solvent vapor phase polishing or treatment, the key characterization parameters which must be determined include the solubility parameter ($\delta$) and the surface energy ($\gamma$). Referring initially to the solubility parameter of the thermoplastic material or polymer, it is known that polymer solutions frequently tolerate large amounts of non-solvents and, in some cases, these improve the solution properties. Also, there are examples where blends of two non-solvents become a good solvent for a polymer, and converse situations where a blends of two solvents become a non-solvent for the polymer. These polymer solution peculiarities led to the development of the concept of the solubility parameter. The quantitative measure of the cohesive properties of a polymer is the cohesive energy and its density is given as $\Delta E$ divided by V, where $\Delta E$ is the energy of vaporization and V is the molar volume. The cohesive energy density represents the concentration of forces which cause molecules to cohere. The heat of mixing of a solvent and a polymer is proportional to the square of the differences between the square roots of the cohesive energy density terms. The square root of the cohesive energy density has been defined to be the solubility parameter, $\delta$. Solution of the polymer in a solvent will occur when the heat of mixing is small, or when the value of $\delta$ for the polymer and solvent are similar. Further detailed calculations of solvent mixtures and application of the concept of solubility parameters can be found in Burrell, *Office Dig. Federation Soc. Paint Technol.*, 27, 726 (1955). See also D. H. Soloman, *The Chemistry of Organic Film Formers*, Robert E. Krieger Publishing Company, New York, N.Y., pp 32–33 (1977).

The next key polymer characterization parameter is the surface energy of the polymer which is a direct manifestation of intermolecular forces. Surface energies are deemed important because of their controlling influence on such practical applications as spinning, polymer adhesion, and, for present purposes, wetting of solids by liquids. The surface energy is the product obtained by multiplying surface tension by the two-thirds power of the molecular weight and specific volume. Surface energies additionally may be calculated employing the McGinniss predictive relationship which is a novel set of linear equations developed to interrelate a wide variety of polymer physical properties with their chemical structure. These novel set of linear equations utilize refractive index, weight fraction of heteroatom contained in the monomer repeat unit of the polymer and electron density fraction for the monomer repeat unit in the polymer as the variables in predicting physical properties of polymeric materials. Further information on the McGinniss predictive relationship can be found in *Organic Coatings and Plastics Chemistry*, Vol. 39, 529 (1978) and *Organic Coatings and Applied Polymer Science Proceedings*, Vol. 46, 214 (1982).

The solubility parameter and surface tension values for a wide variety of common thermoplastic polymers is set forth in Table 1 below.

TABLE 1

POLYMER PHYSICAL PROPERTIES

| Polymer | Solubility Parameter, $\delta$ (cal/cm$^3$)$^{\frac{1}{2}}$ | Surface Energy, $\gamma$ (dyne/cm) |
|---|---|---|
| Polyethylene | 7.7–8.35 | 31 |
| Polypropylene | 8.2–9.2 | 29 |
| Polystyrene | 8.5–9.3 | 33–43 |
| Polyvinyl chloride | 9.4–10.8 | 39 |
| Polyvinylidene chloride | 9.9–12.2 | 40 |
| Polytetrafluoroethylene | 6.2 | 18.5 |
| Polyvinyl acetate | 9.35–11.05 | 36 |
| Polymethyl acrylate | 9.7–10.6 | 41 |
| Polyethylacrylate | 9.25–9.6 | 35 |
| Polymethylmethacrylate | 9.1–12.8 | 39 |
| Polyethylmethacrylate | 8.9–9.15 | 33 |
| Polyacrylonitrile | 12.5–15.4 | 44 |
| Polymethylene oxide | 10.2–11.0 | 36 |
| Nylon | 13.6 | 32–66 |
| Polyethylene terephthalate | 9–11 | 41–47 |
| Polycarbonate | 9–10 | 42 |
| Polysulphone | 9–10 | 42–45 |
| Polydimethyl siloxane | 7.3–7.6 | 24 |
| Cellulose polymers | 12–14 | — |
| Polyvinylidene fluoride | — | 25 |
| Polyvinyl fluoride | — | 28 |
| Polyphenylene oxide | 9.5 | — |

The next requirement of the invention is the characterization of the solvent or solvent blend which will interact with the specific polymer structure of interest to inpart surface enhancement without causing undesired degradative polymer processes, i.e. loss of a physical property. The initial key characterization parameter of the solvent is the solubility parameter of the solvent.

The solubility parameter of the solvent is calculated in the same manner as described with reference to the polymer and additionally is valuable in classifying polymer systems as polar and non-polar. The next characterization parameter is the surface energy or surface tension of the solvent or solvent blend which is important in controlling polymer wetting phenomena. It will be appreciated that when the surface tension values of the solvent or solvent blend is less than the value of the surface energy of the polymer, polymer wetting wil be enhanced. The next characterization parameter of the solvent is the size of the solvent molecules, particularly for solvents which exhibit a destructive effect on the polymer of interest. In a somewhat generalized concept, the molecule size of the solvent controls the rate of diffusion of the solvent into the polymer structure in that, all other factors considered, generally the smaller the molecule size of the solvent, the faster the rate of diffusion of such into the polymer structure. The molecule size is proportional to the molecule or specific volume of the solvent and is caculated by dividing the molecular weight of the solvent by its density. The solubility parameters and surface energies of solvents also can be calculated utilizing the McGinniss predictive relationships discussed above. Several reported solubility parameters and surface tension values for some well known organic solvents are set forth below in Table 2. Further solvent solubility information can be found in *Chemical Review*, Vol. 75, No. 6, 731 (1975) and *The Journal of Paint Technology*, Vol. 42, No. 541, 761 (1970).

TABLE 2
SOLVENT PHYSICAL PROPERTIES

| Solvent | Solubility Parameter, $\delta$ $(cal/cm^3)^{\frac{1}{2}}$ | Surface Tension. $\gamma$ (dyne/cm) |
|---|---|---|
| Acetic acid | 10.1 | 27.8 |
| Acetic anhydride | 13.1 | 32.7 |
| Methanol | 16.5 | 22.61 |
| Ethanol | 12.7 | 22.27 |
| Butyl alcohol | 11.4 | 24.6 |
| Hexyl alcohol | 11.68 | 25.66 |
| Cyclohexanol | 11.4 | 34.50 |
| Ethylene glycol | 14.6 | 47.7 |
| Butyl amine | 8.7 | 24.03 |
| Acetone | 9.9 | 23.7 |
| Methyl ethyl ketone | 9.3 | 24.6 |
| Cyclohexanone | 9.9 | 35.25 |
| Acetophenone | 10.6 | 39.8 |
| Benzaldehyde | 9.4 | 40.04 |
| Carbon tetrachloride | 8.6 | 26.95 |
| Chloroform | 9.3 | 27.16 |
| Methyl chloride | 9.7 | 16.2 |
| Methylene chloride | 9.7 | 26.52 |
| Methyl acetate | 9.6 | 24.6 |
| Ethylene carbonate | 14.7 | 26.31 |
| Amyl acetate | 7.8 | 25.68 |
| Butyl acetate | 8.5 | 25.21 |

A final consideration with respect to the solvents which is important for present purposes is the ability of certain solvents to form constant-boiling mixtures due to their possession of the property of azeotropy. Azeotropic mixtures exhibit distillates which have the same composition as the distilland. Additionally, the boiling point of an azeotropic mixture is lower than the boiling point of any of its constituent parts and it possess a higher vapor pressure than any of its constituent parts. Utilizing solvent mixtures containing lower boiling points is advantageous in that the temperature of the solvent mixture used to treat the polymeric material of choice should be less than the glass transition temperature of the polymer substrate and/or the contact time must be minimized such that the glass transition temperature of the polymer substrate is not reached during the treatment. Azeotropic mixtures are preferred additionally because the composition of a destructive solvent in the mixture is kept constant so that localized high concentrates of the destructive solvent in contact with the polymer being treated is substantially precluded.

Finally, solvents are defined as being destructive and as being non-destructive for present purposes. The terminology used in the prior art, i.e. solvent and non-solvent, is misleading in that solvents as well as non-solvents may actually cause physical damage to the polymeric substrate. For example, oriented polymethyl methacrylate in the presence of non-solvent N-methyl formamide undergoes a whitening phenomenon characterized by optically opaque regions on the surface and in the bulk of the substrate even though the non-solvent N-methyl formamide is not absorbed by the plastic itself. Sung et al., *Polymer Engineering and Science*, Vol. 23, No. 6, 328 (1983). For present purposes, a destructive solvent is a solvent that causes loss of a physical property of the polymer being treated. One physical property which may be used to determine whether a solvent is destructive is the tensile strength of the plastic. For example, destructive solvent for polycarbonate is one which causes severe loss of original tensile strength when exposed to the solvent, for example, for 24 hours at 200° F. (ASTM-D-638-58T). Another method of determining whether a solvent is destructive is whether the solvent induces stress cracking or stress whitening of the plastic substrate under stress or load conditions (ASTM-D-1693-59T).

The ultimate purpose of the invention is to obtain surface smoothing or treatment of the polymeric substrate through utilization of non-destructive vapor phase solvent treatment. Surface smoothing of the polymer substrate is best accomplished when the solubility parameter of the solvent system is approximately the same as the solubility parameter of the specified thermoplastic substrate undergoing treatment. Wetting of the thermoplastic substrate is best accomplished when the surface tension of the solvent system is less than the surface enery of the poymeric substrate being treated. With the foregoing characterization parameters and polymer-solvent interactions understood, several variations of surface treatment in accordance with the present invention are possible and will be discussed below.

For a particular plastic desired to be treated, initial determination of solvents as being destructive or non-destructive must be made. With respect to the set of non-destructive solvents, a determination of a subset of non-destructive solvents which possess a solubility parameter close to the solubility parameter of the thermoplastic substrate of interest will define a subset of solvents which will solubilize the surface of the thermoplastic for its smoothing. For effectively smoothing the entire surface, however, the surface tension of the subset of non-destructive solvents should be less than the surface energy of the thermoplastic substrate in order to promote effective wetting of the entire surface of such substrate. Of course, blends of non-destructive solvents may be useful and the blend of such non-destructive solvents should possess the requisite closeness of solubility parameter and surface tension relationship with respect to the thermoplastic material for finding use in smoothing the surface in accordance with the precepts of the present invention.

Often, however, the most effective surface treatment will be realized by use of a destructive solvent. Such destructive solvent use may be tolerated provided that the underlying concepts in the present invention are adhered to. The solubility parameter and surface tensions of the destructive solvents must be determined along with the solubility parameter and surface tensions for non-destructive solvents. Next, a subset of destructive solvents which possess solubility parameters close to the solubility parameter of the thermoplastic substrate must be selected. The solubility parameter of the non-destructive solvent advantageously will be about the same as the solubility parameter of a thermoplastic, though this requirement is not necessary. At least one of the non-destructive or destructive solvent components of the intended mixture should possess a surface tension less than the surface energy of the thermoplastic substrate in order to promote effective wetting of the thermoplastic substrate by the solvent mixture. Finally, a sub-combination of the subset of destructive solvents and non-destructive solvents which form azeotropic mixtures is determined. Any one of the select sub-combinations will be effective in surface treating the thermoplastic substrate without causing undue physical property losses.

In preferred embodiments of the azeotropic mixture treatment discussed above, the volume of destructive solvent in the azeotropic mixture is minimized in order to minimize exposure of such destructive solvent to the thermoplastic substrate. Also, in order to minimize diffusion of the destructive solvent component into the thermoplastic substrate, it is desirable to use destructive solvents which have very large molecule sizes. By adhering to the minimization of destructive solvent proportion and maximization of molecular size, selection of the suitable azeotropic mixture for treatment can be materially enhanced.

It must be recognized that additional optimization of the particular azeotropic solvent mixture of choice may be aided by further refining the characterization parameters of the thermoplastic substrate and of the solvents. That is, the concept of solubility parameter is an excellent first approximation for present purposes, though it must be recognized that the tendency of a material to form hydrogen bonds and its dipole moment also exert an effect on the solubility of a polymer in a particular solvent or solvent mixture. Further characterization and optimization of the solvent mixture of choice for treatment in accordance with the precepts of the present invention may be enhanced by subjecting the solvents and thermoplastic materials to further use of the McGinniss predictive relationship, discussed above, which can take into account hydrogen bonding, dipole moments, and other physical, chemical, and electrical properties of the solvents and the thermoplastic substrates.

The present invention may be practiced by exposure of the thermoplastic substrate to the solvent or azeotropic solvent mixture in vaporous phase. Vaporization may be accomplished by simple heating of the solvent or azeotropic solvent mixture, optionally at reduced pressure. As noted above, the temperature of and the treatment time must be adjusted so that the thermoplastic substrate is not exposed to too high of a temperature for too long of a time such that thermal degradation is realized. Also, the glass transition temperature of the thermoplastic substrate should not be too closely approached in order to minimize adverse thermal effects. Contact times may be as short as a few seconds or less, though contact times may range on up to several minutes, depending upon the particular solvent or azeotropic solvent mixture, the particular thermoplastic substrate, and possible other factors well known to those skilled in the art.

The vapor phase solvent treatment of the present invention may be used to smooth a roughened surface of a thermoplastic part, such as a thermoplastic part which has become scratched or marred in use. Additionally, the treatment may be used to improve or re-establish the gloss of a thermoplastic substrate or thermoplastic coating. Further, molded thermoplastic parts whose surfaces may be somewhat mottled, may have a more uniform and even surface color and appearance by treatment in accordance with the present invention. Of importance, is the ability to the present invention to enhance the surface of the thermoplastic substrate without causing loss of an important physical property for which the thermoplastic substrate is used.

The following examples show how the present invention can be practiced but should not be construed as limiting. In this application, all percentages and proportions are by weight and all units are in the metric system, unless otherwise expressly indicated. Also, all citations referred to herein are expressly incorporated herein by reference.

EXAMPLES

Comparative Examples

Samples of 508 micron (20 mil) thick sheets of Lexan brand polycarbonate (General Electric Company) measuring 8.89 cm$^2$ (3.5 inches square) were subjected to at least 20 double-rubs with 000 steel wool under a pressure of two kilograms weight. Transversal rubbing with the steel wool across the sheet surface forward and backward constituted one double-rub. The surfaces of the polycarbonate samples after rubbing were severely scratched to a degree that almost 50 percent loss in transparency was evident. The scratched samples then were freely suspended in an unconstrained manner and subjected to various atmospheric pressure, vapor phase treatment conditions as described in the prior art below.

Treatment 1 was conducted in accordance with U.S. Pat. No. 2,294,479 utilizing a mixture of methyl ethyl ketone (29 weight parts) and carbon tetrachloride (71 weight parts) at a vapor phase temperature of 73.8° C. and an exposure time of ½ to 5 seconds. A second treatment in accordance with this patent was conducted utilizing ethyl acetate (15 weight parts) and ethanol (85 weight parts) at a vapor phase temperature of 73.5° C. for exposure times of ½ to 10 seconds. The second treatment procedure was conducted in accordance with U.S. Pat. No. 3,020,661 utilizing trichloroethylene at 85° C. and methyl ethyl ketone at 80° C. for exposure times of 1 to 2 minutes. The third treatment was conducted in accordance with U.S. Pat. No. 3,807,054 utilizing a mixture of methylene chloride and cellulose acetate (20:1 weight ratio, respectively) at 30° C. for treatment times of 1 to 5 seconds.

All of the unconstrained scratched samples treated by the foregoing prior art polishing methods exhibited excellent superficial appearance. All of the surface defects from the steel wool scratching were removed and the samples demonstrated excellent optical clarity. The treated samples then were subjected to load stress by connecting one end of the treated sample to a fixed support while the other end had a 20 kilogram weight suspended from it. The load stress treated samples then were permitted to stand in an atmosphere of air and in an atmosphere of alcohol for up to one week. All of the prior art, stressed samples began to whiten and show signs of stress cracking and significant decreases in their physical properties.

the polycarbonate and enhance smoothing. Such lower surface energy solvents, however, also would tend to enhance stress cracking of the polycarbonate plastic unless selected in accordance with the precepts of the present invention.

In Table 3 is listed a wide variety of solvents for polycarbonate plastics which have been classified as destructive solvents and non-destructive solvents specifically for polycarbonate plastic materials.

TABLE 3

Destructive and Nondestructive Solvents for Polycarbonate

| Destructive Solvents | Solubility Parameter, $\delta$ $(cal/cm^3)^{\frac{1}{2}}$ | Surface Energy, $\gamma$ (dyne/cm) | Nondestructive Solvents | Solubility Parameter, $\delta$ $(cal/cm^3)^{\frac{1}{2}}$ | Surface Energy, $\gamma$ (dyne/cm) |
|---|---|---|---|---|---|
| Acetic anhydride | 13.1 | 32.7 | Acetic acid | 10 | 27.8 |
| Hexyl alcohol | 11.68 | 25.66 | Butyl alcohol | 11 | 24.6 |
| Butyl amine | 8.6 | 24.3 | Ethylene glycol | 14.6 | 47.7 |
| Acetophenone | 10.6 | 39.8 | Amyl acetate | 7.8 | 25.68 |
| Cyclohexanone | 9.9 | 35.25 | Butyl ether | 7.76 | 20.65 |
| Methyl ether ketone | 9.3 | 24.6 | Cyclohexane | 8.2 | 25.5 |
| Benzaldehyde | 9.4 | 40.04 | Hexane | 7.4 | 19 |
| Carbon tetrachloride | 8.6 | 26.95 | | | |
| Chloroform | 9.3 | 27.14 | | | |
| Ethylene chloride | 9.8 | 24.15 | | | |
| Butyl acetate | 8.5 | 25 | | | |
| Ethyl acetate | 9.1 | 24 | | | |
| Dioxane | 10 | 32.40 | | | |
| Tetrahydrofuran | 9.1 | 27.40 | | | |
| Toluene | 8.9 | 28.5 | | | |
| Xylene | 8.8 | 29 | | | |
| Acetonitrile | 11.9 | 29 | | | |
| Benzonitrile | 8.6 | 39 | | | |
| Phenol | 10.2 | 41 | | | |
| Dimethyl formamide | 12.1 | 40 | | | |

In another experiment, additional scratched samples of the polycarbonate were prestressed by bending the samples end-to-end to achieve a radius of curvature of about 1.27 to 2.54 cm. The prestressed scratched samples then were subjected to the atmospheric vapor phase polishing conditions described by the prior art above. These prior art vapor phase treatments resulted in an almost immediate loss of physical properties as determined by the samples cracking. In similar experiments utilizing different thermoplastic substrates (polysulfone, polyvinyl chloride, polyethylene terephthalate, polymethyl methacrylate, and polyphenylene oxide) virtually identical results were obtained, i.e. superficial surface polishing was accomplished by the prior art treatment methods but such surface polishing was accomplished at the expense of long-term structural strength and integrity of the plastic substrates treated.

Example 1

The present invention is unique in that the solvent selection process involves the determination of specific destructive and non-destructive solvents for the specific plastic material to be treated. As described above, an initial characterization of the plastic substrate to be subjected to the treatment is required. In Table 1, polycarbonate is shown to have a solubility parameter of 9.5 $(calories/centimeters^3)^{\frac{1}{2}}$ and a surface energy value of 42 dynes/centimeter. Solvents having about the same approximate solubility parameter as polycarbonate will tend to dissolve the polycarbonate polymer and perform as surface polishing agents for the polycarbonate substrate. These solvents, however, also may cause cracking and degradation of the polycarbonate sample as occurred by the comparative treatments. Solvents having surface energies lower than the surface energy of polycarbonate will tend to spread on the surface of From Table 3, it is apparent that solvents possessing a solubility parameter value ranging from about 8.5 to 13.1 $(cal/cm^3)^{\frac{1}{2}}$ and surface energy values of between 24 and 41 dynes/cm are classified as destructive solvents for polycarbonate. Solvents having solubility parameter values below 8.5 and ranging from about 10 to 15 $(calories/cm^3)^{\frac{1}{2}}$ and surface energies between about 25 and 41 dynes/cm are classified as non-destructive solvents for polycarbonate.

Non-destructive solvents having solubility parameter values close to polycarbonate (eg. acetic acid or cyclohexane) should act directly as suitable vapor phase polishing agents for polycarbonate. In fact, polycarbonate samples scratched as described in the comparative example were subjected to an equal weight mixture of cyclohexane and acetic acid vapors at 80° C. for at least a 10 minute exposure times to provide somewhat improved smooth surface treated parts which possessed no cracking or loss of physical properties as occurred in the comparative example. Even under load stress, no loss of physical properties was observed.

With respect to the embodiment utilizing an azeotropic mixture of destructive and non-destructive solvents, from Table 3 it is seen that xylene is a destructive solvent for polycarbonate while amyl acetates are non-destructive solvents. Azeotropic mixtures of meta-xylene and iso-amyl acetate are formed by a mixture that is 46% xylene and 54% amyl acetate at 136° C. In fact, load stressed samples of polycarbonate were treated for 1 to 5 minutes with such azeotropic vapor phase mixture to surface polish the polycarbonate samples without signs of cracking or stress crazing being observed. Similar excellent results in surface polishing without physical property loss was obtained by utilizing an azeotropic mixture of 44.87% butyl alcohol (non-destructive solvent) and 55.2% butyl acetate (destructive solvent) at 113.5° C. The same excellent results also were obtained by treatment of stressed and unstressed polycarbonate samples utilizing an azeotropic mixture of 72% chloroform (destructive solvent) and 28% hexane (non-destructive solvent) at 60° C.

With respect to the selection of a destructive solvent possessing a relative large molecular size. Table 3 shows that methyl ethyl ketone, acetophenone, carbon tetrachloride, and butyl acetate all are destructive solvents for polycarbonate. The actual molecule sizes of these solvents, however, vary greatly. The molar volume for butyl acetate is 131.7 cm$^3$/mol, acetophenone is 117.1 cm$^3$/mol, carbon tetrachloride is 96.5 cm$^3$/mol, and methyl ethyl ketone is 89.6 cm$^3$/mol. Since smaller molecules diffuse more rapidly into the plastic substrate, it is desirable to use an azeotropic mixture of a destructive solvent having a high molecular volume in combination with a non-destructive solvent such as, for example, cyclohexane, in order to effect efficient surface polishing without increasing the probability of destructive solvent infusion into the plastic substrate. In fact, when stressed samples of polycarbonate were treated with azeotropic mixtures of cyclohexane and butyl acetate and with cyclohexane and methyl ethyl ketone, the cyclohexane/butyl acetate azeotropic mixtures could be tolerated for longer treatment times with less noticeable minor stress cracking than was observed for the cyclohexane/methyl ethyl ketone azeotropic mixtures.

Example 2

In this example, the thermoplastic substrates were polysulfone, polymethyl methacrylate, polyvinyl chloride, and polyphenylene oxide. The solubility parameter and surface energy values for these four plastics are set forth in Table 1. In Tables 4, 5, 6, and 7 below, are listed the major destructive and non-destructive solvents for these four plastics.

TABLE 4

Destructive and Nondestructive Solvents for Polysulfone

| Destructive Solvents | Solubility Parameter, $\delta$ (cal/cm$^3$)$^{\frac{1}{2}}$ | Surface Energy, $\gamma$ (dyne/cm) | Nondestructive Solvents | Solubility Parameter, $\delta$ (cal/cm$^3$)$^{\frac{1}{2}}$ | Surface Energy, $\gamma$ (dyne/cm) |
|---|---|---|---|---|---|
| Acetic anhydride | 13.1 | 32.7 | Acetic acid | 10 | 27.8 |
| n-Butyl amine | 8.7 | 24.3 | Ethylene glycol | 14.6 | 47.7 |
| Methyl ethyl ketone | 9.3 | 24.6 | Butyl alcohol | 11 | 24.6 |
| Chloroform | 9.3 | 27.14 | Butyl ether | 7.76 | 20.65 |
| Ethylene chloride | 9.8 | 24.15 | Cyclohexane | 8.2 | 25.5 |
| Ethyl acetate | 9.1 | 24 | Hexane | 7.4 | 19 |
| Tetrahydrofuran | 9.1 | 27.4 | | | |
| Toluene | 8.9 | 28.5 | | | |
| Acetonitrile | 11.9 | 29 | | | |
| Dimethyl formamide | 12.1 | 40 | | | |

TABLE 5

Destructive and Nondestructive Solvents for Polymethylmethacrylate

| Destructive Solvents | Solubility Parameter, $\delta$ (cal/cm$^3$)$^{\frac{1}{2}}$ | Surface Energy, $\gamma$ (dyne/cm) | Nondestructive Solvents | Solubility Parameter, $\delta$ (cal/cm$^3$)$^{\frac{1}{2}}$ | Surface Energy, $\gamma$ (dyne/cm) |
|---|---|---|---|---|---|
| Methyl ethyl ketone | 9.3 | 24.6 | Ethylene glycol | 14.6 | 47.7 |
| Carbon tetrachloride | 8.6 | 26.95 | Hexane | 7.4 | 19 |
| Toluene | 8.9 | 28.5 | Tributyl amine | 8.7 | 24–25 |
| Toluene | 8.9 | 28.5 | | | |
| Chloroform | 9.3 | 27.14 | | | |
| tetrahydrofuran | 9.1 | 27.40 | | | |
| Cyclohexanone | 9.9 | 35.25 | | | |
| Methanol | 14.3 | 22.61 | | | |

TABLE 6

Destructive and Nondestructive Solvents for Polyvinyl Chloride

| Destructive Solvents | Solubility Parameter, $\delta$ (cal/cm$^3$)$^{\frac{1}{2}}$ | Surface Energy, $\gamma$ (dyne/cm) | Nondestructive Solvents | Solubility Parameter, $\delta$ (cal/cm$^3$)$^{\frac{1}{2}}$ | Surface Energy, $\gamma$ (dyne/cm) |
|---|---|---|---|---|---|
| Methyl ethyl ketone | 9.3 | 24.6 | Hexane | 7.6 | 19 |
| Toluene | 8.9 | 28.5 | Butyl alcohol | 11 | 24.6 |
| Cyclohexanone | 9.9 | 35.25 | Ethanol | 12.9 | 22.27 |
| Methylene chloride | 9.9 | 26.52 | Ethylene glycol | 14.6 | 47.7 |
| Acetic acid | 10 | 27.8 | Methanol | 14.3 | 22.61 |
| Dioxane | 10 | 32.40 | Cyclohexane | 8.2 | 25.5 |
| Dimethyl formamide | 12.1 | 40 | Carbon tetrachloride | 8.6 | 26.95 |
| | | | Tributyl amine | 8.7 | 24.25 |

TABLE 7

Destructive and Nondestructive Solvents for Polyphenylene Oxide

| Destructive Solvents | Solubility Parameter, $\delta$ (cal/cm$^3$)$^{\frac{1}{2}}$ | Surface Energy, $\gamma$ (dyne/cm) | Nondestructive Solvents | Solubility Parameter, $\delta$ (cal/cm$^3$)$^{\frac{1}{2}}$ | Surface Energy, $\gamma$ (dyne/cm) |
|---|---|---|---|---|---|
| Acetic anhydride | 13.1 | 32.7 | Butyl alcohol | 11 | 24.6 |
| Cyclohexanol | 11.4 | 34.5 | Ethylene glycol | 14.6 | 47.7 |

TABLE 7-continued

Destructive and Nondestructive Solvents for Polyphenylene Oxide

| Destructive Solvents | Solubility Parameter, $\delta$ $(cal/cm^3)^{\frac{1}{2}}$ | Surface Energy, $\gamma$ (dyne/cm) | Nondestructive Solvents | Solubility Parameter, $\delta$ $(cal/cm^3)^{\frac{1}{2}}$ | Surface Energy, $\gamma$ (dyne/cm) |
|---|---|---|---|---|---|
| Butyl amine | 8.7 | 24.3 | Acetonitrile | 11.9 | 29 |
| Methyl ethyl ketone | 9.3 | 24.6 | | | |
| Carbon tetrachloride | 8.6 | 26.95 | | | |
| Chloroform | 9.3 | 27.14 | | | |
| Ethyl acetate | 9.1 | 24 | | | |
| Hexane | 7.4 | 19 | | | |
| Toluene | 8.9 | 28.5 | | | |

From Table 4 it is seen that solvents having solubility parameter values in the range of about 8.7 to 13.1 and surface energies of 26–40 are classified as destructive solvents, while solvents having solubility parameter values below 8.7 and from 10–15 with surface energy values below 28 and above 41 are classified as non-destructive solvents for polysulfone. From Table 5 it is seen that solvents having solubility parameter values ranging between 8.6 and 14.3 with surface energy values between 26 and 36 are destructive solvents, while those solvents having solubility parameters below 8.6 and above 14.3 with surface energy values below 26 and above 36 are non-destructive solvents for polymethyl methacrylate. From Table 6 it is seen that the destructive solvent solubility parameter range is 8.9–12.1 and the surface energy range is 24.6–40, while the non-destructive solvent solubility parameter ranges below 8.9 and above 12.1 while surface energy values range from below 27 and above 40 for polyvinyl chloride. Finally, from Table 7 it is seen that the solubility parameter values for destructive solvents for polyphenylene oxide range from 7.4 to 13 with surface energy values ranging from 19 to 36.5, while non-destructive solvents for polyphenylene oxide possess solubility parameter ranges of 11–15 with surface energy values ranging from 24.6–48.

Samples of each of these four plastic substrates were prepared and scratched in the manner described for the comparative treatment example. The results of atmospheric pressure vapor phase solvent polishing of each of these four plastic substrates is set forth in Table 8 below.

TABLE 8

Solvent Vapor Phase Polishing of Plastic Substrates

| Thermoplastic Substrate | Destructive Solvent | Nondestructive Solvent | Azeotropic Mixture | Results |
|---|---|---|---|---|
| Polysulfone | Ethyl acetate Chloroform Methyl ethyl ketone | — | — | Surface polished but cracked under severe load conditions |
| Polysulfone | — | Cyclohexane/ acetic acid (50/50) | — | Exhibited surface polishing effects but did not crack under severe load conditions |
| Polysulfone | — | — | Chloroform (72)/ hexane (28) | Surface polished with no cracks under severe loading |
| Polymethyl methacrylate | Ethyl acetate Methyl ethyl ketone | — | — | Surface polished but cracked under loading |
| Polymethyl methacrylate | — | Hexane/ cyclohexane | — | Some polishing effects but no cracking under load conditions |
| Polymethyl methacrylate | — | — | Chloroform (72)/ hexane (28) or ethyl acetate (74)/ butanol (26) | Surface polished with no cracks |
| Polyvinyl chloride | Methylene chloride Methyl ethyl ketone (MEK) | — | — | Surface polished but lost tensile strength properties |
| Polyvinyl chloride | — | Carbon tetrachloride | — | Some surface polishing but retained tensile strength properties |
| Polyvinyl chloride | — | — | 40% MEK/60% ethyl alcohol | Surface polished and retained tensile strength properties |
| Polypropylene oxide | Chloroform | — | — | Surface polished but cracked under severe load condition |
| Polypropylene oxide | — | — | Butyl alcohol (64.8)/ butyl acetate (55.2) or Butyl alcohol (33.5)/ carbon tetrachloride (66.5) | Surface polished and did not crack |

The above-tabulated results clearly demonstrate the present invention. With respect to the polysulfone substrates, the three destructive solvents all caused cracking under load conditions even though the surfaces were polished. Use of a mixture of two non-destructive solvents provided surface polishing but did not result in cracking of the substrate under load. The use of an azeotropic mixture of a destructive solvent and a non-destructive solvent, however, resulted in better surface polishing than the non-destructive solvent blend, but similarly resulted in no cracks developing under severe loading conditions.

Substantially the same results were realized in the surface treatment of polymethyl methacrylate, polyvinyl chloride, and polypropylene oxide as was realized with the polysulfone plastics. The efficacy of surface treatment with preservation of physical properties, thus, is demonstrated.

Example 3

A pigmented coating composition was prepared from 100 weight parts of a copolymer of methyl methacrylate and ethyl acrylate (weight ratio of 82:18) in 50 parts of methyl ethyl ketone in which was dispersed 80 parts of rutile titanium dioxide under high shear mixing. To the resulting uniform paste-like material was added an additional 100 parts of methyl ethyl ketone to form a mixture of paint-like consistency which was brush applied to a steel panel. The coating then was baked at 150° C. in an oven for 30 minutes to produce a dried glossy film. The glossy film surface was rubbed with 000 steel wool to produce a matte, non-glossy finish. The scratched film then was subjected to treatment with an azeotropic mixture of chloroform and hexane (72:28 weight parts, respectively) and to ethyl acetate and butanol (74:26 weight parts, respectively) in the manner described above. The treatment was conducted at 75° C. for 1–7 minutes treating time. The treatment resulted in the almost full return of the original glossy surface to the film.

Example 4

A pigmented polyvinyl chloride foam was prepared according to the general concepts outlined in *Polymer Engineering and Science,* Vol. 15, No. 10, pp 747–756 (October 1975). Polyviny chloride polymers were compounded with 10% by weight carbon black and 5% by weight of 1,1'-diazobisformamide blowing agent. The formulation was placed into a hollow mold cavity and heated until a foamed structure developed. The resulting foamed structure has a very poor surface gloss and was almost grey in surface color appearance. The foamed structure then was subjected to treatment with both of the azeotropic solvent mixtures described in Example 3. The treatment resulted in the production of a high surface gloss finish and a somewhat darker and more uniform surface coloration for the foamed structure.

Example 5

Acetic acid, water, and toluene form a ternary azeotrope at a composition of 65.3%, 10%, and 24.7%, respectively. Toluene is shown to be a destructive solvent for polycarbonate in Table 3, while acetic acid and water are non-destructive solvents for polycarbonate. Scratched samples of polycarbonate were treated at 50° C. for 10 minutes with the described ternary azeotropic solvent mixture to reestablish a somewhat smooth surface without causing cracking or crazing to be developed by the treated polycarbonate samples under load conditions. Thus, azeotropic mixtures of two, three, or more solvents may be used to advantage in accordance with the precepts of the present invention. Further information on ternary azeotropes is found in A. Findley's text *The Phase Rule,* Dover Publications (1951).

I claim:

1. Method for treating the surface of a thermoplastic substrate for improving said surface without significant loss of physical properties thereof which comprises:
   (a) determining the solubility parameter, $\delta_T$, of said thermoplastic substrate and the surface energy, $\delta_T$, of said thermoplastic substrate;
   (b) determining a set of destructive solvents which are detrimental to a physical property of said thermoplastic substrate;
   (c) determining a set of non-destructive solvents which are not detrimental to the physical properties of said thermoplastic substrate;
   (d) determining the solubility parameters for said set of destructive solvent, $\delta_D$, and for said set of non-destructive solvent, $\delta_N$, and the surface tension for said set of destructive solvent, $\delta_D$, and for said non-destructive solvent, $\delta_N$;
   (e) selecting a subset of said destructive solvents which possess solubility parameters, $\delta_D$, close to the solubility parameter of said thermoplastic substrate, $\delta_T$;
   (f) selecting sub-combinations of said subset of destructive solvents (e), and said set (c) of non-destructive solvents which form azeotropic mixtures, at least one of said solvents possessing a surface tension which is less than the surface energy of said thermoplastic substrate; and
   (g) treating said surface with an azeotropic mixture of at least one of said select sub-combinations in the vapor phase.

2. The method of claim 1 wherein said subset of said destructive solvents (e) possesses a surface tension, $\gamma_D$, which is less than the surface energy of said thermoplastic substrate.

3. The method of claim 1 wherein is selected a subset of said non-destructive solvents which possesses a surface tension less than the surface energy of said thermoplastic substrate.

4. The method of claim 3 wherein said subset of said destructive solvents and said subset of said non-destructive solvents both possess surface tensions which are less than the surface energy of said thermoplastic substrate.

5. The method of claim 1 wherein said set of non-destructive solvents also possess solubility parameters close to the solubility parameter of said thermoplastic substrate.

6. The method of claim 1 wherein said sub-combinations of step (g) are selected so that the volume of said destructive solvent in said azeotropic mixtures is minimized.

7. The method of claim 1 wherein said sub-combination selected in step (g) are azeotropic mixtures in which the molecular volume of said destructive solvents are maximized.

8. The method of claim 1 wherein said treating of step (g) is done at a temperature of less than the glass transition temperature of said thermoplastic substrate.

* * * * *